United States Patent
Sawai

(10) Patent No.: US 9,686,796 B2
(45) Date of Patent: *Jun. 20, 2017

(54) COMMUNICATION CONTROL APPARATUS, COMMUNICATION CONTROL METHOD, AND COMMUNICATION SYSTEM

(71) Applicant: Sony Corporation, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,550

(22) Filed: Feb. 11, 2016

(65) Prior Publication Data

US 2016/0165611 A1 Jun. 9, 2016

Related U.S. Application Data

(63) Continuation of application No. 14/685,762, filed on Apr. 14, 2015, now Pat. No. 9,301,309, which is a (Continued)

(30) Foreign Application Priority Data

Mar. 31, 2011 (JP) ................................. 2011-078073

(51) Int. Cl.
*H04W 72/04* (2009.01)
*H04W 16/14* (2009.01)
(Continued)

(52) U.S. Cl.
CPC ....... *H04W 72/0453* (2013.01); *H04W 16/14* (2013.01); *H04W 28/08* (2013.01);
(Continued)

(58) Field of Classification Search
CPC ............... H04W 28/08; H04W 72/082; H04W 72/0453; H04W 16/14; H04W 52/243;
(Continued)

(56) References Cited

U.S. PATENT DOCUMENTS 6,351,649 B1 2/2002 Watanabe et al.
2003/0099215 A1 5/2003 O'Shea
(Continued)

FOREIGN PATENT DOCUMENTS

JP 2007-184850 A 7/2007
JP 2011-10265 A 1/2011
(Continued)

OTHER PUBLICATIONS

International Search Report issued Jun. 5, 2012, in PCT/JP2012/055824.
(Continued)

*Primary Examiner* — Brian D Nguyen
(74) *Attorney, Agent, or Firm* — Oblon, McClelland, Maier & Neustadt, L.L.P.

(57) ABSTRACT

There is provided a communication control apparatus including a parameter acquisition unit that acquires parameters to calculate coverage of secondary systems from a secondary usage node operating the secondary systems on a frequency channel allocated to a primary system, a calculation unit that calculates the coverage of the secondary systems using the parameters acquired by the parameter acquisition unit, and an interference control unit that notifies a detection node that detects neighboring secondary systems of the secondary systems, of coverage information representing the coverage of the secondary systems calculated by the calculation unit.

9 Claims, 16 Drawing Sheets

Related U.S. Application Data continuation of application No. 13/983,324, filed as application No. PCT/JP2012/055824 on Mar. 7, 2012, now Pat. No. 9,060,367.

(51) Int. Cl.
*H04W 72/08* (2009.01)
*H04W 28/08* (2009.01)
*H04W 52/24* (2009.01)
*H04W 28/04* (2009.01)
*H04W 28/18* (2009.01)
*H04W 64/00* (2009.01)

(52) U.S. Cl.
CPC ....... *H04W 52/243* (2013.01); *H04W 72/082* (2013.01); *H04W 28/048* (2013.01); *H04W 28/18* (2013.01); *H04W 64/006* (2013.01)

(58) Field of Classification Search
CPC .. H04W 28/048; H04W 28/18; H04W 64/006
See application file for complete search history.

(56) References Cited

U.S. PATENT DOCUMENTS

| | | | |
|---|---|---|---|
| 2009/0161608 A1 | 6/2009 | Steer et al. | |
| 2009/0161614 A1* | 6/2009 | Grandblaise | H04W 16/06 370/329 |
| 2009/0265543 A1 | 10/2009 | Khetawat et al. | |
| 2009/0310501 A1 | 12/2009 | Catovic et al. | |
| 2010/0272038 A1 | 10/2010 | Hamalainen et al. | |
| 2010/0302948 A1 | 12/2010 | Sawai et al. | |
| 2010/0304680 A1 | 12/2010 | Kuffner et al. | |
| 2010/0309806 A1 | 12/2010 | Wu et al. | |
| 2011/0090890 A1 | 4/2011 | Seok et al. | |
| 2011/0151886 A1 | 6/2011 | Grayson et al. | |
| 2011/0165903 A1* | 7/2011 | Selen | H04W 16/14 455/509 |
| 2012/0026941 A1 | 2/2012 | Ahmad et al. | |
| 2012/0033621 A1* | 2/2012 | Mueck | H04W 72/0453 370/329 |
| 2012/0052891 A1* | 3/2012 | Irnich | H04W 52/243 455/501 |
| 2012/0083303 A1 | 4/2012 | Min et al. | |
| 2012/0093092 A1* | 4/2012 | Kasslin | H04W 72/082 370/329 |
| 2012/0106461 A1 | 5/2012 | Kasslin et al. | |
| 2012/0122448 A1* | 5/2012 | Mueck | H04W 28/24 455/424 |
| 2012/0230250 A1 | 9/2012 | Kasslin et al. | |
| 2013/0242932 A1* | 9/2013 | Tiirola | H04W 16/14 370/329 |

FOREIGN PATENT DOCUMENTS

| | | |
|---|---|---|
| JP | 2011-529304 A | 12/2011 |
| WO | WO 2009/152097 A1 | 12/2009 |
| WO | WO 2010/011973 A1 | 1/2010 |
| WO | WO 2011/148035 A1 | 12/2011 |

OTHER PUBLICATIONS

H. Kang, et al., "Coexistence System Description", Wireless Coexistence Working Group, IEEE P802.19-11/0011r1, Jan. 17, 2010, 17 pages.

Office Action issued Dec. 9, 2014 Japanese Patent Application No. 2011-078073.

Extended European Search Report issued on Sep. 25, 2015 for Application No. 12765385.5.

Hyunduk Kang et al.; "Coexistence System Description"; IEEE vol. 802.19 Wireless Coexistence Working Group (WG); Jan. 2010; pp. 1-18.

Combined Chinese Office Action and Search Report issued Jun. 29, 2016 in Patent Application No. 201280014496.7 (with English language translation).

Hyunduk Kang, et al. "Procedures and Protocols, and Coexistence Mechanisms and Algorithms Proposal" Wireless Coexistence, IEEE 802.19-10/0149r1, Sep. 2010, pp. 1-29.

Office Action issued Aug. 9, 2016 in Japanese Patent Application No. 2015-160922 (with English translation).

Ryo Sawai, et al. "Coexistence Mechanism and Its Algorithm", Wireless Coexistence, IEEE 802.19-10/0145r1, 2010, 33 pages.

Doug Vernier, et al. "IBOC Coverage and Interference", NAB Radio & Broadcasters Clinic, 2006, 50 pages.

Paivi Ruuska, et al. "Neighbor Setting Procedures", IEEE 802.19-11/0002r1, 2011, 22 pages.

Office Action issued Mar. 28, 2017 in Japanese Patent Application No. 2015-160922 (with English translation).

* cited by examiner

FIG.10
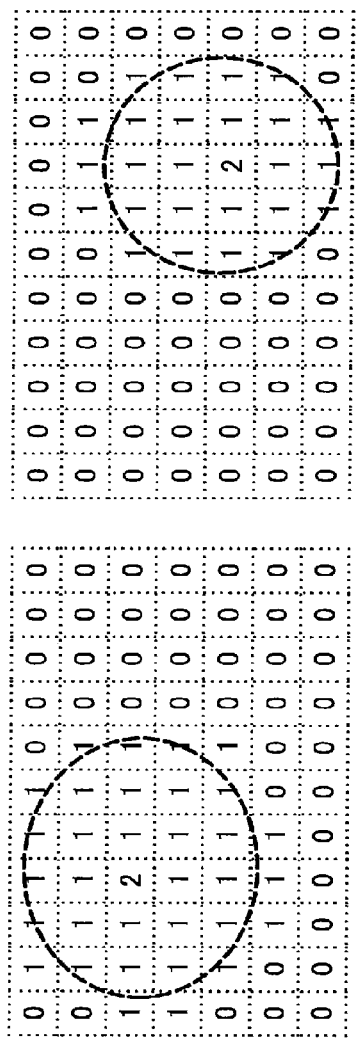
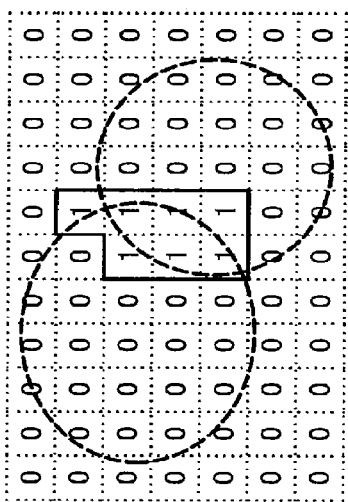
0: NO INTERFERENCE
1: INTERFERENCE PRESENT

FIG.12

```
[CM #A]
  - Intra-CM
    -- PAIR ID : A01
      --- SECONDARY SYSTEM ID : N1 @CM#A
      --- SECONDARY SYSTEM ID : N2 @CM#A
      --- CLASS : C2

[CM #B]
  - Intra-CM
    -- PAIR ID : B01
      --- SECONDARY SYSTEM ID : N3 @CM#B
      --- SECONDARY SYSTEM ID : N4 @CM#B
      --- CLASS : C1
```

NEIGHBORING SYSTEM LIST

FIG.13

```
[CM #A]
  - Intra-CM
    -- PAIR ID: A01
      --- SECONDARY SYSTEM ID: N1 @CM#A
      --- SECONDARY SYSTEM ID: N2 @CM#A
      --- CLASS: C2

-- PAIR ID: A02
      --- SECONDARY SYSTEM ID: N2 @CM#A
      --- SECONDARY SYSTEM ID: N5 @CM#A
      --- CLASS: C2

- Inter-CM
    -- PAIR ID: A11
      --- SECONDARY SYSTEM ID: N5 @CM#A
      --- SECONDARY SYSTEM ID: N3 @CM#B
      --- CLASS: C2

[CM #B]
  - Intra-CM
    -- PAIR ID: B1
      --- SECONDARY SYSTEM ID: N3 @CM#B
      --- SECONDARY SYSTEM ID: N4 @CM#B
      --- CLASS: C1

- Inter-CM
    -- PAIR ID: B11
      --- SECONDARY SYSTEM ID: N3 @CM#B
      --- SECONDARY SYSTEM ID: N5 @CM#A
      --- CLASS: C2
```

NEIGHBORING SYSTEM LIST

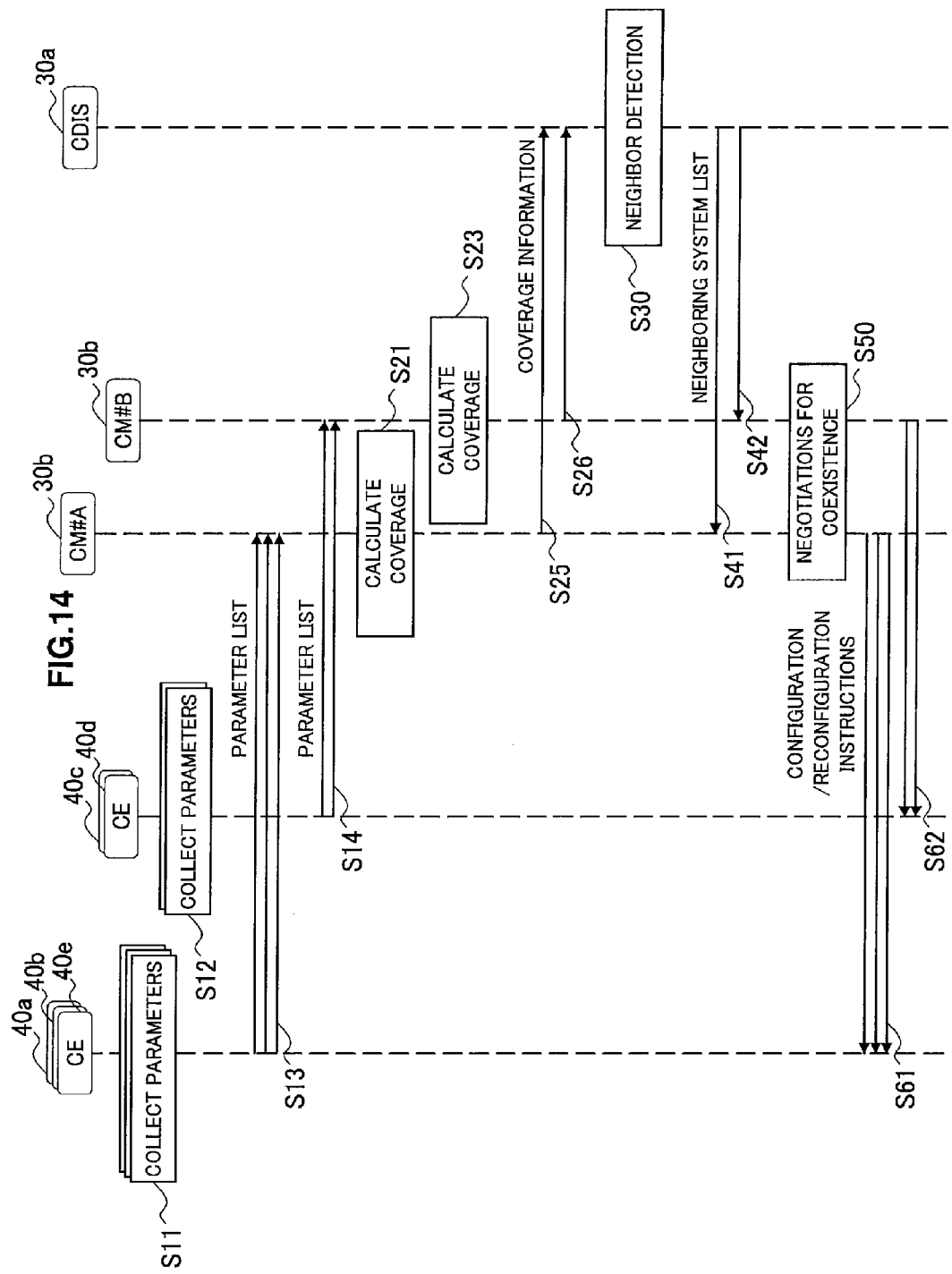

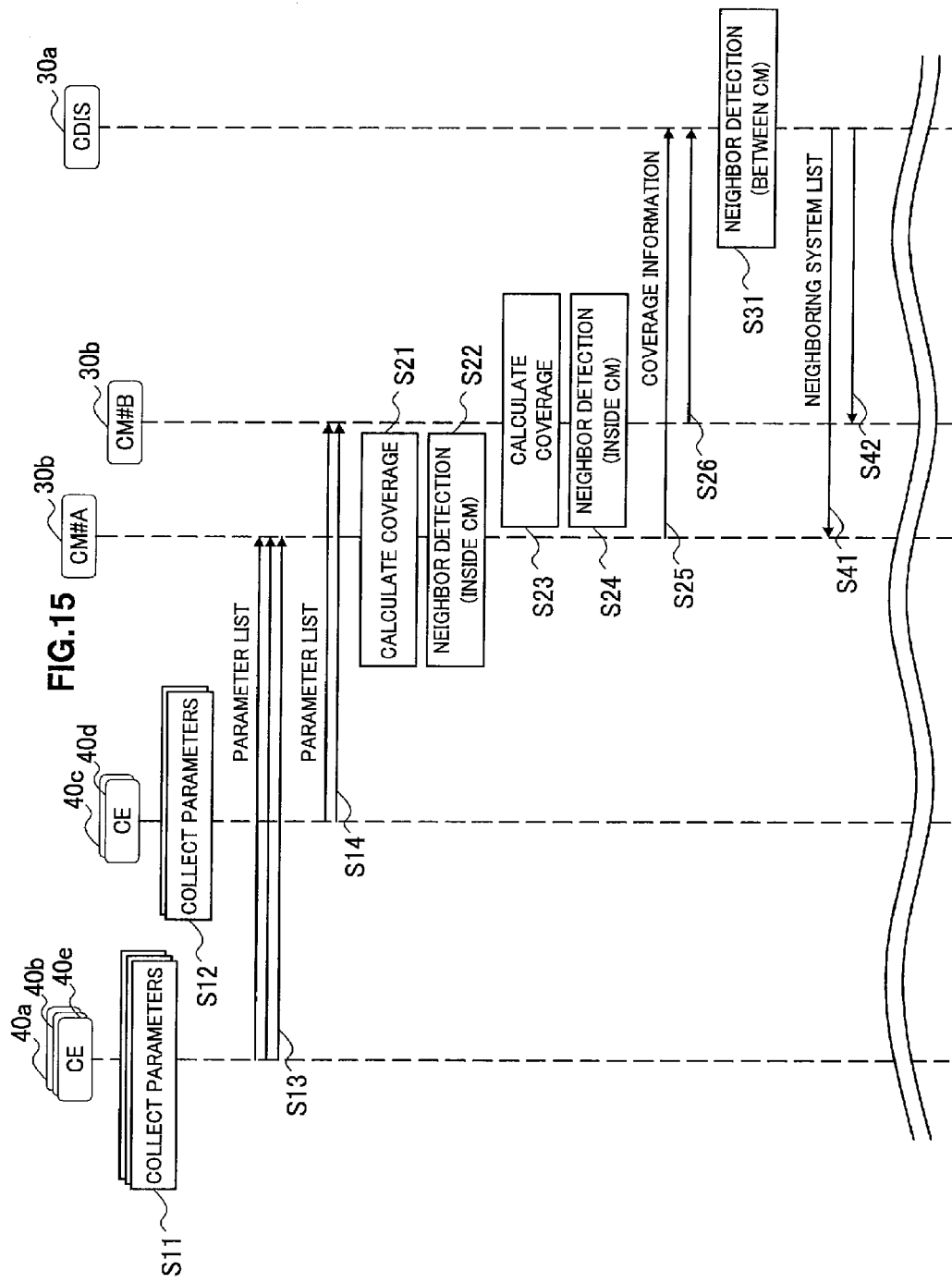

COMMUNICATION CONTROL APPARATUS, COMMUNICATION CONTROL METHOD, AND COMMUNICATION SYSTEM

CROSS REFERENCE TO RELATED APPLICATIONS

This application is a continuation of U.S. application Ser. No. 14/685,762, filed Apr. 14, 2015, now U.S. Pat. No. 9,301,309, which is a continuation of U.S. application Ser. No. 13/983,324, filed Aug. 2, 2013, now U.S. Pat. No. 9,060,367, the entire contents of each are incorporated herein by reference. U.S. application Ser. No. 13/983,324 is a National Stage of PCT/JP2012/055824 filed Mar. 7, 2012, which claims the benefit of priority from Japanese Patent Application No. 2011-078073, filed Mar. 31, 2011.

TECHNICAL FIELD

The present disclosure relates to a communication control apparatus, a communication control method, a program, and a communication system.

BACKGROUND ART

As one of measures to mitigate exhaustion of frequency resources in the future, the discussion about secondary usage of a frequency is under way. The secondary usage of a frequency is to use a part or all of a frequency channel preferentially assigned to some system secondarily by another system. In general, the system to which a frequency channel is preferentially assigned is called a primary system and the system that secondarily uses the frequency channel is called a secondary system.

A TV white space is an example of the frequency channel discussed for secondary usage. The TV white space refers to, among frequency channels assigned to a TV broadcasting system as a primary system, a channel that is not used by the TV broadcasting system depending on the region. By releasing the TV white space for secondary usage, efficient utilization of frequency resources can be realized. As specifications of the wireless access method of the physical layer (PHY) and the MAC layer to enable secondary usage of the TV white space, for example, a plurality of standard specifications like IEEE802.22, IEEE802.11af, and ECMA (European Computer Manufacturer Association)-392 (CogNea) is known.

The IEEE802.19 is currently working to allow smooth coexistence of a plurality of secondary systems using different wireless access methods. For example, Non-Patent Literature 1 below divides various functions needed for coexistence of secondary systems into three functional entities of CM (Coexistence Manager), CE (Coexistence Enabler), and CDIS (Coexistence Discovery and Information Server). CM is a functional entity that mainly makes a decision for coexistence. CE is a functional entity to be an interface that mediates instruction transmission or information exchange between CM and a secondary usage node. CDIS is a functional entity to be a server that manages information of a plurality of secondary systems in a unified manner. CDIS also has a neighbor discovery function which detects neighboring secondary systems that may interfere with each other.

CITATION LIST

Non-Patent Literature

Non-Patent Literature 1: "Coexistence System Description", [online], [Searched on Mar. 17, 2011], the Internet <URL:https://mentor.ieee.org/802.19/dcn/11/19-11-0011-01-0001-coexistence-system-description.pdf>

SUMMARY OF INVENTION

Technical Problem

However, to detect a neighboring secondary system (hereinafter, called a neighboring system) that may interfere with each other, the collection of various parameters to calculate coverage of each secondary system is demanded. Thus, when one functional entity attempts to perform neighbor detection in a unified manner, the load of calculation processing of the one functional entity and the load of traffic accompanying the parameter collection increase if the number of secondary systems is large. If a plurality of functional entities can perform neighbor detection in cooperation, by contrast, it is expected that the above concentration of load can be avoided so that a plurality of secondary systems can be operated smoothly.

Solution to Problem

According to an embodiment of the present disclosure, there is provided a communication control apparatus including a parameter acquisition unit that acquires parameters to calculate coverage of secondary systems from a secondary usage node operating the secondary systems on a frequency channel allocated to a primary system, a calculation unit that calculates the coverage of the secondary systems using the parameters acquired by the parameter acquisition unit, and an interference control unit that notifies a detection node that detects neighboring secondary systems of the secondary systems, of coverage information representing the coverage of the secondary systems calculated by the calculation unit.

Further, according to an embodiment of the present disclosure, there is provided a communication control method of a control node that controls communication by a secondary usage node operating secondary systems on a frequency channel allocated to a primary system, the method including acquiring parameters to calculate coverage of the secondary systems from the secondary usage node, calculating the coverage of the secondary systems using the acquired parameters, and notifying a detection node that detects neighboring secondary systems of the secondary systems, of coverage information representing the calculated coverage of the secondary systems.

Further, according to an embodiment of the present disclosure, there is provided a communication control system including a secondary usage node that operates secondary systems on a frequency channel allocated to a primary system, a control node that controls communication by the secondary usage node, and a detection node that detects neighboring secondary systems of the secondary systems. The control node includes a parameter acquisition unit that acquires parameters to calculate coverage of the secondary systems from the secondary usage node, a calculation unit that calculates the coverage of the secondary systems by using the parameters acquired by the parameter acquisition unit, and an interference control unit that notifies the detection node of coverage information representing the coverage of the secondary systems calculated by the calculation unit.

Advantageous Effects of Invention

According to the present disclosure, as described above, the concentration of load accompanying neighbor detection for coexistence of secondary systems can be avoided.

BRIEF DESCRIPTION OF DRAWINGS

FIG. 10 is an explanatory view illustrating detection of neighboring systems based on the coverage information illustrated in FIG. 9.

FIG. 12 is a first explanatory view illustrating an example of a neighboring system list generated by CDIS in an embodiment.

FIG. 13 is a second explanatory view illustrating an example of the neighboring system list generated by CDIS in an embodiment.

FIG. 14 is a flow chart showing an example of the flow of communication control processing for neighbor detection according to an embodiment.

FIG. 15 is a flow chart showing an example of the flow of communication control processing for neighbor detection according to a first modification.

DESCRIPTION OF EMBODIMENT

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be provided in the following order:
1. System Overview
   1-1. Overall System Configuration
   1-2. Description of Functional Entities
   1-3. Arrangement Example of Functional Entities
   1-4. Flow of Processing for General Neighbor Detection
   1-5. Explanation of Problem in an Embodiment
2. Configuration Example of Apparatus According to an Embodiment
   2-1. CM
   2-2. CDIS
   2-3. Data Example
   3. Flow of Processing According to an Embodiment
4. Modifications
   4-1. First Modification
   4-2. Second Modification
5. Summary <1. System Overview>
[1-1. Overall System Configuration]

Figure 1:
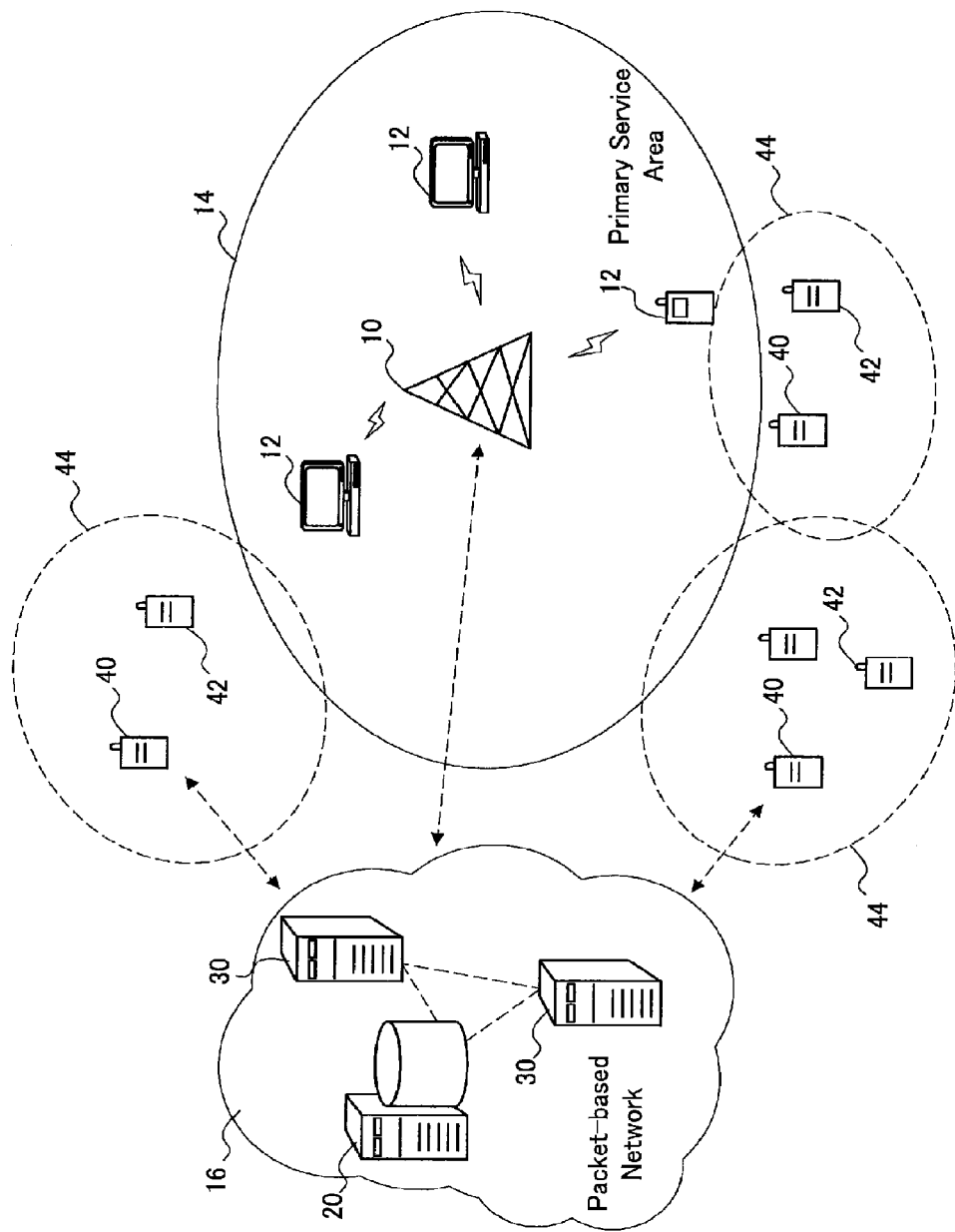
FIG. 1 is an explanatory view illustrating an overview of a communication system according to an embodiment.

FIG. 1 is an explanatory view illustrating an overview of a communication system according to an embodiment.

Referring to FIG. 1, a primary transmitting station 10 constituting a primary system and a plurality of primary receiving stations 12 are shown. The primary transmitting station 10 provides a primary system service to the primary receiving stations 12 positioned inside a service area 14. The primary transmitting station 10 may be, for example, a broadcasting station of TV broadcasting or a wireless base station or a relay station of a cellular communication method. When the primary transmitting station 10 is a broadcasting station of TV broadcasting, the primary receiving station 12 is a receiver having a receiving antenna for TV broadcasting and a tuner. When the primary transmitting station 10 is a wireless base station of a cellular communication method, the primary receiving station 12 is a wireless terminal operating according to the cellular communication method. In the description that follows, the primary transmitting station 10 and the primary receiving station 12 may generically be called primary usage nodes.

The primary transmitting station 10 is connected to a data server 20 positioned in a packet-based network 16. The packet-based network 16 may be the Internet or a backbone network of a primary system. The data server 20 is a server apparatus having a database storing data on secondary usage of secondary channels. At least one of communication control apparatuses 30 is connected to the data server 20. The communication control apparatus 30 is an apparatus introduced to control coexistence among a plurality of secondary systems using frequency channels assigned to a primary system.

In FIG. 1, a plurality of secondary usage nodes 40, 42 is further shown. The secondary usage node 40 is an apparatus that provides a secondary system service (hereinafter, called a secondary communication service) to the secondary usage node 42 positioned inside a service area 44 by using a frequency channel assigned to a primary system. When the primary system is a TV broadcasting system, the secondary usage node 40 is also called a master TVBD (TV Band Device). The secondary usage node 40 is typically has a geo-location function and a function to access the communication control apparatus 30. The secondary usage node 40 may directly be accessible to the data server 20. The secondary usage node 42 is an apparatus positioned inside each of the service areas 44 to use the secondary communication service provided by the secondary usage node 40. When the primary system is a TV broadcasting system, the secondary usage node 42 is also called a slave TVBD. In principle, the secondary usage node 42 transmits a radio signal after obtaining permission from the nearby secondary usage node 40.

Figure 2:
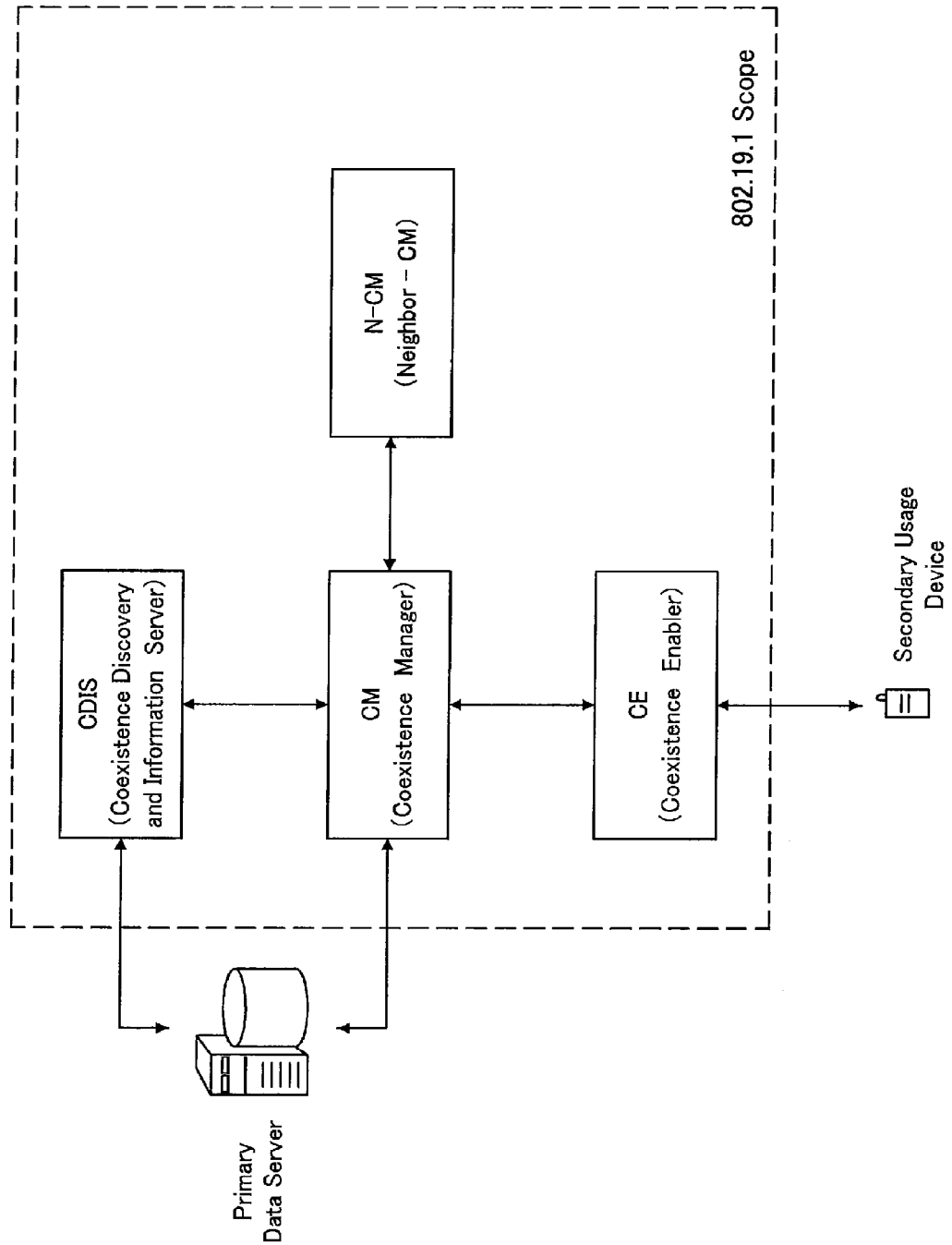
FIG. 2 is an explanatory view showing correlations among three functional entities to support coexistence.

The secondary usage node 40 registers information about a secondary system with the data server 20 before starting the operation of the secondary system. Then, the secondary usage node 40 operates the secondary system based on control information provided from the data server 20. However, when a plurality of secondary systems is operated in parallel like the situation shown in FIG. 1, the risk of fatally affecting the primary system may be incurred due to collisions of signals between secondary systems or overlapping interference caused by signals transmitted from each secondary system. Particularly, when the wireless access methods used by secondary systems are different, it is difficult to operate the system while maintaining cooperation among secondary systems, further raising the above risk. Thus, the IEEE802.19 is working on a mechanism to smoothly support coexistence of a plurality of secondary systems (see Non-Patent Literature 1 described above). In IEEE802.19, various functions to support coexistence of secondary systems are divided into three groups of functional entities of CM, CE, and CDIS (see FIG. 2).

[1-2. Description of Functional Entities]

(1) CM (Coexistence Manager)

CM is a functional entity that makes a decision for coexistence. CM acquires information about a primary system, information about available channels, and information about secondary systems. Sources from which information is acquired by CM include CDIS, other CM, and secondary usage nodes (accessed via CE). Based on the above information, CM decides which frequency channel to be used by a secondary usage node under the control thereof to operate the secondary system. CM may further decide additional control parameters such as the maximum transmission power, recommended wireless access method, and period of updating position data for each secondary usage node. Then, according to decided parameters, CM allows each secondary usage node to operate a secondary system or to reconfigure a secondary system.

(2) CE (Coexistence Enabler)

CE is a functional entity to be an interface that mediates instruction transmission or information exchange between CM and a secondary usage node. For example, CE converts information held by a secondary usage node into a format that can be used by CM and transmits the converted information to the CM. CE also converts an instruction about coexistence of secondary systems from CM into a format that can be executed by a secondary usage node and transmits the converted information to the secondary usage node.

(3) CDIS (Coexistence Discovery and Information Server)

CDIS is a functional entity to be a server that manages information of a plurality of secondary systems. For example, CDIS collects information about secondary systems from each secondary usage node via CE and CM. CDIS also collects information about the primary system and information about available channels from the data server 20. Then, CDIS stores collected information in a database. The information stored by CDIS is used when a decision about coexistence is made by CM. CDIS may select master CM (CM that supervises a plurality of CM and makes a decision intensively) among a plurality of CM. CDIS also has a neighbor discovery function which detects neighboring secondary systems that may interfere with each other.

At least one of the above three functional entities is implemented in each of the communication control apparatuses 30 shown in FIG. 1. Incidentally, a part of the functional entities may be implemented on the individual secondary usage nodes 40. In addition, a part of the functional entities may also be implemented in the same apparatus as the data server 20.

[1-3. Arrangement Example of Functional Entities]

Figure 3:
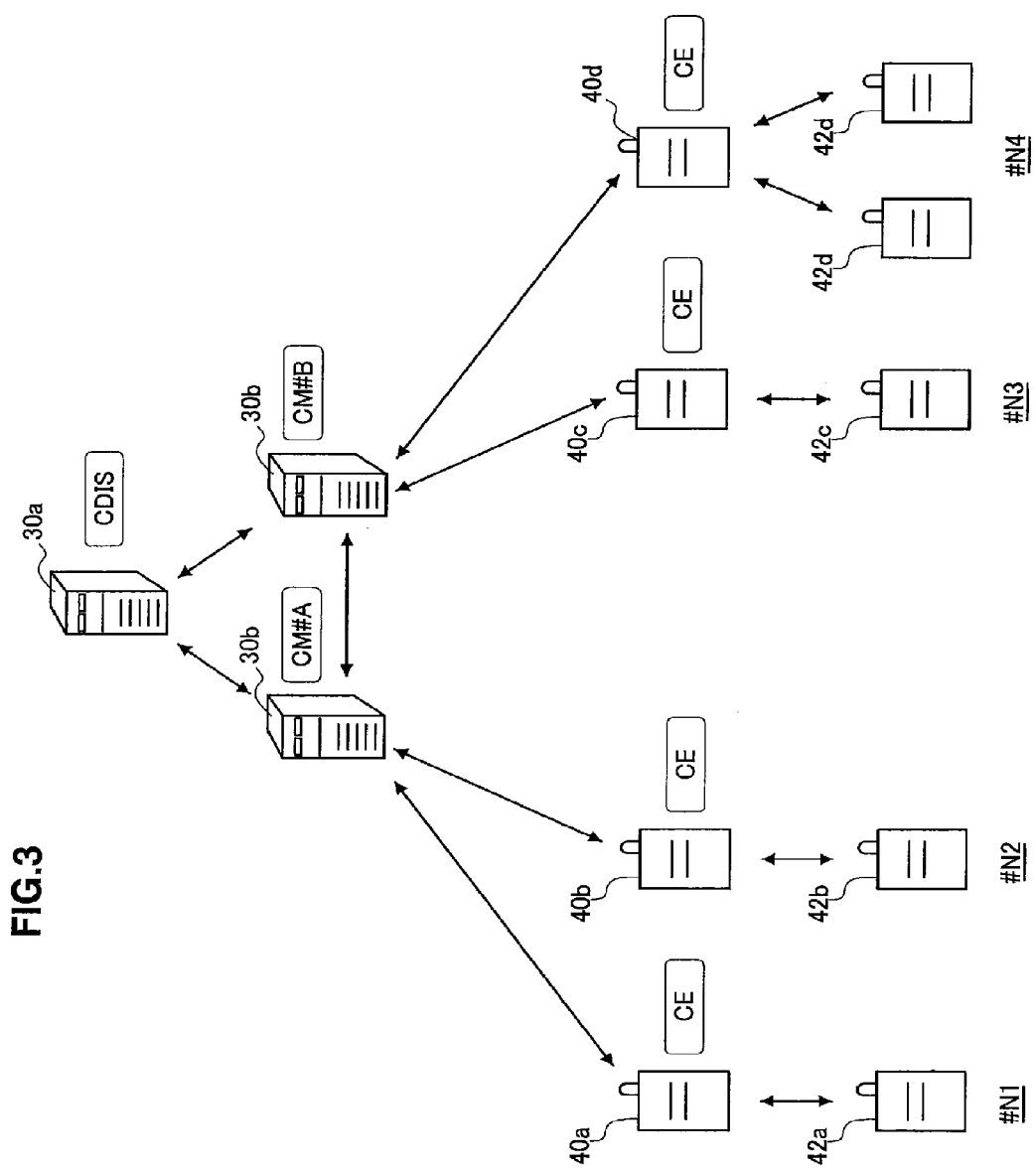
FIG. 3 is an explanatory view showing an example of arrangement of the functional entities.

The above three functional entities may be arranged in each apparatus as shown, for example, in FIG. 3. The arrangement of the functional entities described here is only by way of example and other arrangements may also be used.

Referring to FIG. 3, CDIS is arranged in a communication control apparatus 30a and CM is arranged in each of two communication control apparatuses 30b. First CM (CM#A) is arranged in one of the communication control apparatuses 30b to which secondary usage nodes 40a, 40b belong. Second CM (CM#B) is arranged in the other communication control apparatus 30b to which secondary usage nodes 40c, 40d belong. The secondary usage node 40a operates a secondary system N1 together with a secondary usage node 42a. The secondary usage node 40b operates a secondary system N2 together with a secondary usage node 42b. The secondary usage node 40c operates a secondary system N3 together with a secondary usage node 42c. The secondary usage node 40d operates a secondary system N4 together with a secondary usage node 42d. CE is arranged on each of the secondary usage nodes 40a, 40b, 40c, 40d. Thus, each of the secondary usage nodes 40 as master devices operating each secondary system has at least CE to interact with CM.

[1-4. Flow of Processing for General Neighbor Detection]

Figure 4:
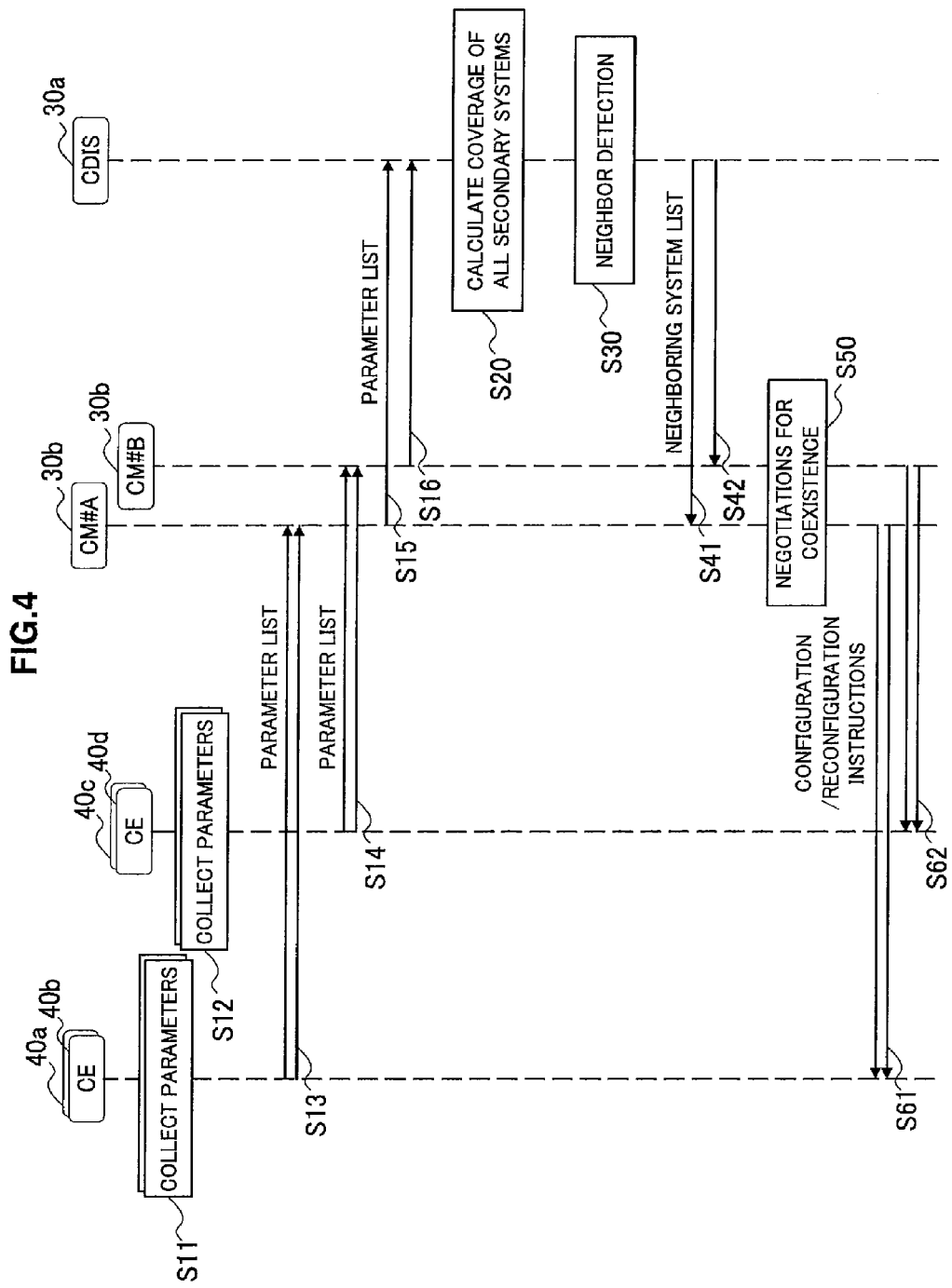
FIG. 4 is a flow chart showing an example of the flow of communication control processing for general neighbor detection.

When functional entities are arranged as shown in the example of FIG. 3, processing for general neighbor detection may be performed in the flow shown in FIG. 4.

Referring to FIG. 4, each of the secondary usage nodes 40a, 40b first collects parameters to calculate coverage (that is, the communication range or the range of service area) of each secondary system (step S11). Similarly, each of the secondary usage nodes 40c, 40d collects parameters to calculate coverage of each secondary system (step S12). Parameters collected here include at least one of the position of each secondary usage node, antenna height, maximum transmission power, antenna gain, and minimum reception sensitivity.

Next, each of the secondary usage nodes 40a, 40b transmits a parameter list containing collected parameters to the communication control apparatus (CM#A) 30b (step S13). Similarly, each of the secondary usage nodes 40b, 40c transmits a parameter list containing collected parameters to the communication control apparatus (CM#B) 30b (step S14). The communication control apparatus (CM#A) 30b transfers the acquired parameter list to the communication control apparatus (CDIS) 30a (step S15). Similarly, the communication control apparatus (CM#B) 30b transfers the acquired parameter list to the communication control apparatus (CDIS) 30a (step S16)

The communication control apparatus (CDIS) 30a uses the acquired parameter lists to calculate coverage of all secondary systems under control (step S20). Next, the communication control apparatus (CDIS) 30a determines the possibility of interference for each combination of secondary systems to detect neighboring systems (step S30). Then, the communication control apparatus (CDIS) 30a provides a neighboring system list describing combinations of detected neighboring systems to the communication control apparatus (CM#A) 30b and the communication control apparatus (CM#B) 30b (steps S41, S42).

Next, if the neighboring system list indicates the presence of secondary systems that may interfere with each other, the communication control apparatus (CM#A) 30b and the communication control apparatus (CM#B) 30b negotiate to control interference (step S50). For example, at least one of the utilized channel of neighboring systems, wireless access method, and maximum transmission power may be adjusted by the negotiations here. Then, one or both of the communication control apparatus (CM#A) 30b and the communication control apparatus (CM#B) 30b instruct the secondary usage nodes 40 to configure or reconfigure the system to reflect a negotiation result in the configuration of each secondary system (steps S61, S62).

[1-5. Explanation of Problem in an Embodiment]

In the flow of processing for neighbor detection shown in FIG. 4, CDIS in the coexistence system performs neighbor detection of all secondary systems under control in a unified manner. To perform neighbor detection, it is necessary for CDIS to collect parameters to calculate coverage of all secondary systems. However, with an increasing number of secondary systems, the load of traffic accompanying the parameter connection by CDIS may adversely affect the network. In addition, the load of calculation processing for neighbor detection may exceed the processing capacity of CDIS.

Figure 5:
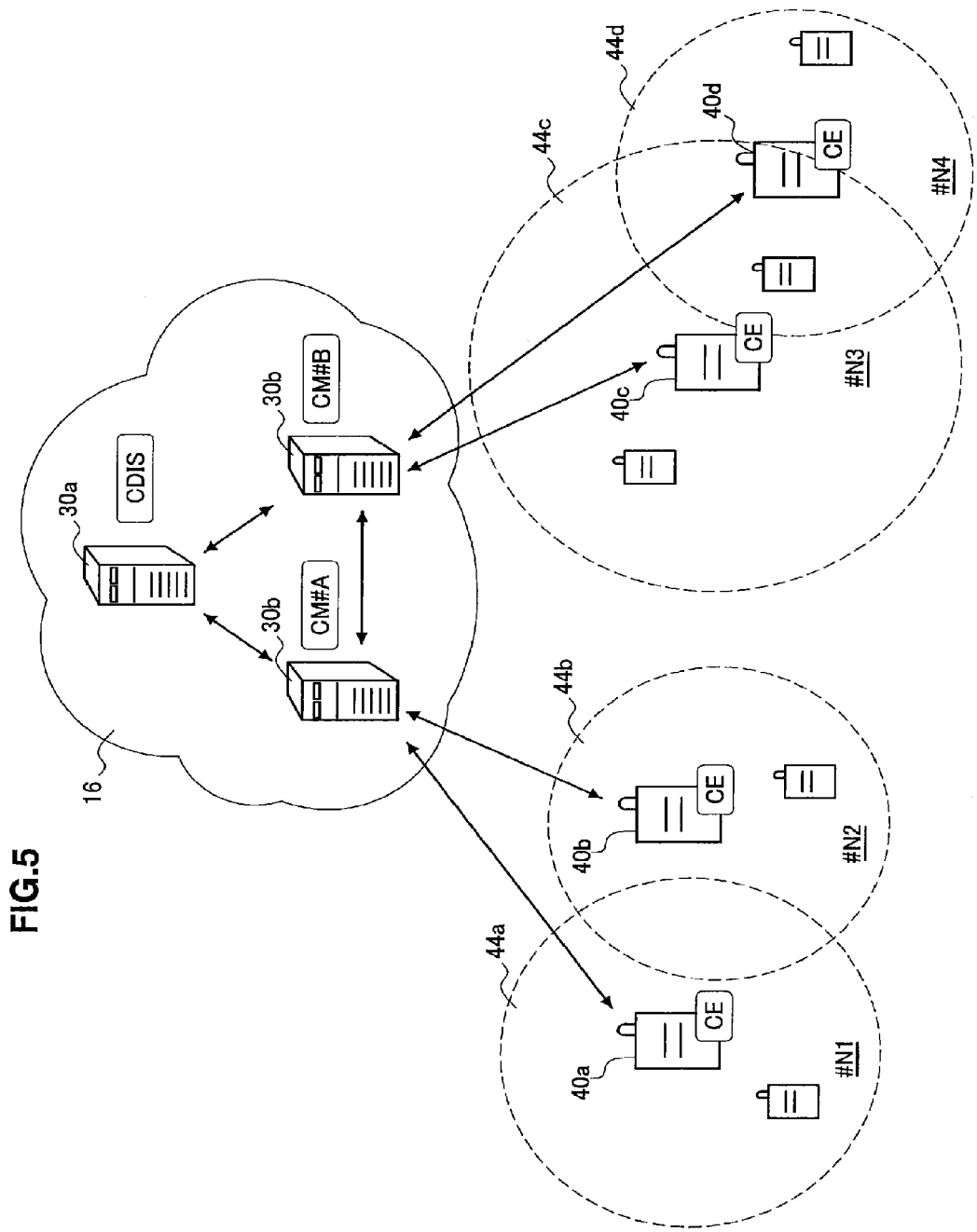
FIG. 5 is an explanatory view showing a first example of the physical relationship of secondary systems.
Figure 6:
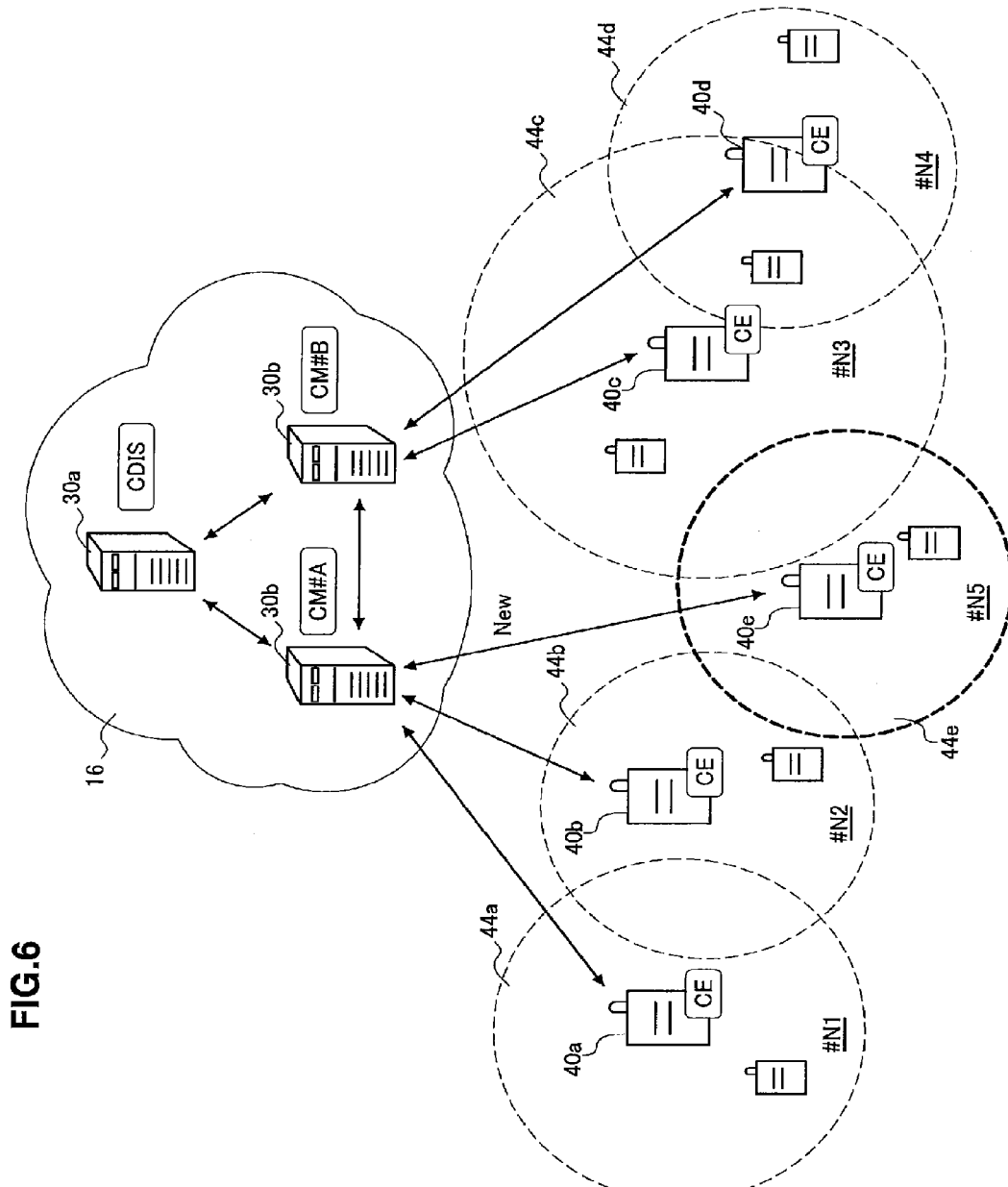
FIG. 6 is an explanatory view showing a second example of the physical relationship of secondary systems.

Referring to FIG. 5, for example, coverage of the secondary system N1 operated by the secondary usage node 40a and that of the secondary system N2 operated by the secondary usage node 40b overlap. Thus, the secondary systems N1, N2 are mutually neighboring systems. Because the secondary usage nodes 40a, 40b belong to the communication control apparatus (CM#A) 30b, the communication control apparatus (CM#A) 30b can grasp that the secondary systems N1, N2 are mutually neighboring systems. Also, coverage of the secondary system N3 operated by the secondary usage node 40c and that of the secondary system N4 operated by the secondary usage node 40d overlap. Thus, the secondary systems N3, N4 are mutually neighboring systems. Because the secondary usage nodes 40c, 40d belong to the communication control apparatus (CM#B) 30b, the communication control apparatus (CM#B) 30b can grasp that the secondary systems N3, N4 are mutually neighboring systems. Under such circumstances, it is assumed that, as shown in FIG. 6, a new secondary usage node 40e that operates a secondary system N5 further appears and the secondary usage node 40e belongs to the communication control apparatus (CM#A) 30b. Coverage of the secondary system N5 overlaps with that of the secondary system N2 and that of the secondary system N3. However, the communication control apparatus (CM#A) 30b does not know the presence of the secondary system N3 and coverage thereof and so cannot recognize mutual interference between the secondary system N5 and the secondary system N3. In addition, the communication control apparatus (CM#B) 30b does not know the appearance of the secondary system N5 and coverage thereof and so cannot recognize mutual interference between the secondary system N3 and the secondary system N5.

That is, in a coexistence system in which a plurality of secondary systems participate, the presence of a node that determines the possibility of interference between secondary systems extending over CM is indispensable. However, as described above, the load of calculation processing of CDIS in the existing mechanism and the load of traffic accompanying the parameter collection could prevent a smooth operation of a plurality of secondary systems.

When a plurality of communication operators (including broadcasting operators) operates systems, needs for each operator to avoid the disclosure of detailed parameters of the system to other operators as much as possible may arise. However, it is difficult to meet such needs in a configuration in which one CDIS collects parameters of all secondary systems.

Thus, in an embodiment described in the next and subsequent sections, the above problem of load is avoided and also smooth coexistence systems operated by a plurality of operators is enabled by offloading a part of general functions of CDIS to CM to reduce the amount of data transmitted from CM to CDIS.

<2. Configuration Example of Apparatus According to an Embodiment>

[2-1. CM]

Figure 7:
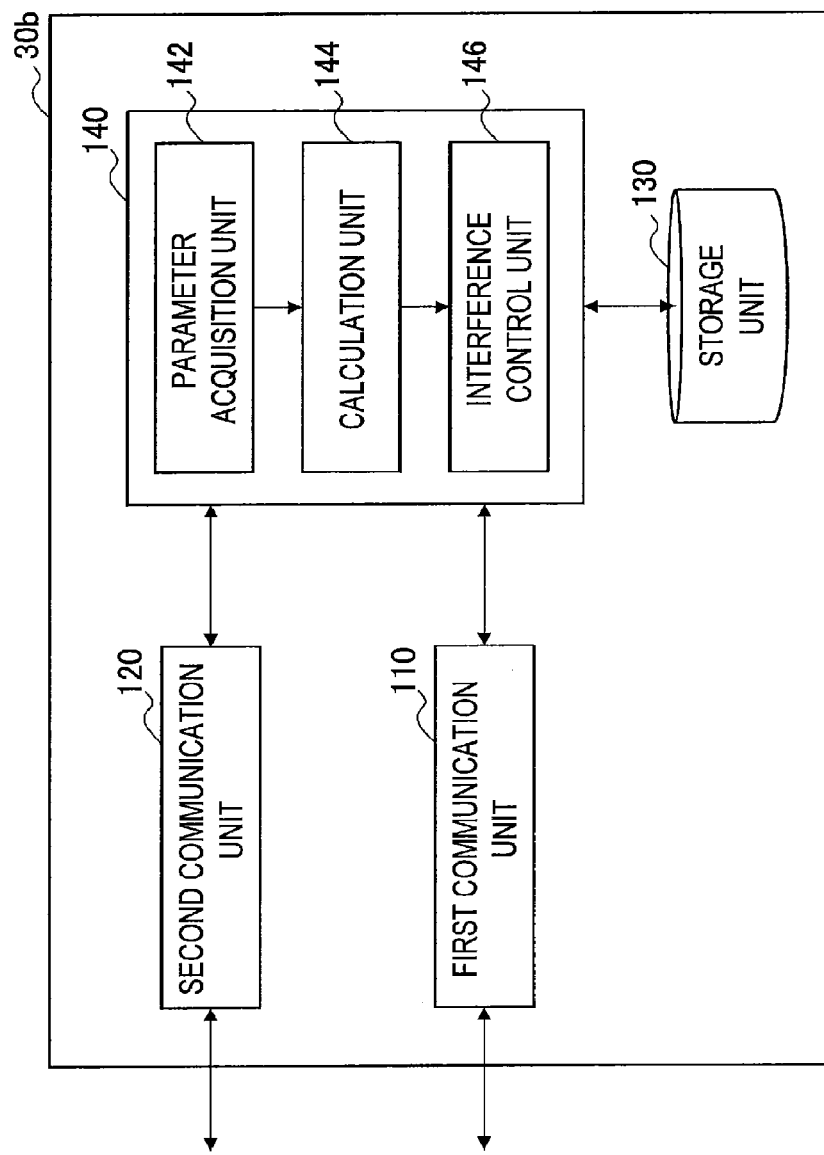
FIG. 7 is a block diagram showing an example of a configuration according to an embodiment of a communication control apparatus corresponding to CM.

FIG. 7 is a block diagram showing an example of the configuration of the communication control apparatus 30b according to the present embodiment. The communication control apparatus 30b is an apparatus equivalent to CM. From the viewpoint of simplicity of the description, the description of functions of CM other than the function related to neighbor detection is omitted here. Referring to FIG. 7, the communication control apparatus 30b includes a first communication unit 110, a second communication unit 120, a storage unit 130, and a control unit 140.

The first communication unit 110 is a communication interface that mediates communication between the communication control apparatus 30b and the secondary usage node 40. The first communication unit 110 supports any wireless communication protocol or wire communication protocol to establish communication connection between the communication control apparatus 30b and at least the one secondary usage node 40.

The second communication unit 120 is a communication interface that mediates communication between the communication control apparatus 30b and the other communication control apparatus 30. The second communication unit 120 typically supports a packet-based (wire or wireless) communication protocol to establish communication connection between the communication control apparatus 30b and the other communication control apparatus 30.

The storage unit 130 is configured by a semiconductor memory or a storage medium such as a hard disk and stores programs and data for processing by the communication control apparatus 30b. Data stored in the storage unit 130 may include, for example, a parameter list collected by the secondary usage node 40, coverage information generated by the control unit 140 described below, and a neighboring system list provided by the communication control apparatus 30a.

The control unit 140 corresponds to a processor such as a CPU (Central Processing Unit) or DSP (Digital Signal Processor). The control unit 140 allows the function of CM according to the present embodiment to be carried out by executing programs stored in the storage unit 130 or another storage medium. More specifically, the control unit 140 includes a parameter acquisition unit 142, a calculation unit 144, and an interference control unit 146.

The parameter acquisition unit 142 acquires parameters to calculate coverage of a secondary system from each of the secondary usage nodes 40 operating the secondary system on a frequency channel allocated to the primary system via the first communication unit 110. Coverage of a secondary system herein refers to the service area of each secondary system or the geographical range of an area in which communication can be performed. The range of a guard area that may be provided on the outer circumference of the service area may also be included in coverage (or may not be included). Parameters to calculate coverage of a secondary system may include at least one parameter of the position of each secondary usage node, antenna height, maximum transmission power, antenna gain, and minimum reception sensitivity.

The calculation unit 144 calculates coverage of each secondary system using parameters acquired by the parameter acquisition unit 142.

For example, the calculation unit 144 may calculate coverage of each secondary system according to the technique using, as the first technique, a propagation path curve described in "Method for point-to-area predictions for terrestrial services in the frequency range 30 mhz to 3000 mhz" (International Telecommunications Commission (ITU), RECOMMENDAION ITU-R P1546-3, 2007). According to the first technique, a statistical curve (propagation path curve) based on measured values to derive a communication distance (communicable distance at a fixed location rate and a fixed hour rate) from the antenna height and electric field strength is stored in the storage unit 130 in advance. Then, the calculation unit 144 converts the maximum transmission power of the secondary usage node 40 into electric field strength to acquire the communication distance corresponding to the antenna height of the secondary usage node 40 and the electric field strength from the propagation path curve. The communication distance becomes the radius of coverage of the secondary system operated by the secondary usage node 40.

Instead, as the second technique, the calculation unit 144 may calculate coverage of each secondary system according to the technique using an evaluation formula in the urban district model (see "DEJITARU WAIYARESU DENSOU GIJUTSU (Digital Wireless Transmission Technique)" (by Seiichi Sampei, Pearson Education Japan, pp. 16-19)) of the Okumura/Hata curve. In this case, the calculation unit 144 calculates the maximum allowable path loss from the maximum transmission power of the secondary usage node 40 and the minimum reception sensitivity of the secondary usage node 42. Then, the calculation unit 144 calculates the communication distance by substituting the calculated path loss and the antenna height into the evaluation formula. The communication distance becomes the radius of coverage of the secondary system operated by the secondary usage node 40.

If no wireless signal of a secondary system is received in a specific position as a result of sensing by the secondary usage node 42, the calculation unit 144 may exclude the position from coverage of the secondary system.

The interference control unit 146 notifies a detection node that detects neighboring systems by determining the possibility of interference between secondary systems of coverage information representing coverage of each secondary system under control calculated by the calculation unit 144. In the present embodiment, the detection node is the communication control apparatus 30a having CDIS. The coverage information of which CDIS is notified from the interference control unit 146 may be map information indicating whether each of a plurality of geographical blocks belongs to coverage of each secondary system. Instead, the coverage information may be information indicating the reference position (for example, the position of the secondary usage node 40 as the master TVBD) and the radius of coverage of each secondary system. A concrete example of coverage information will be described in detail later. When coverage information is notified from the interference control unit 146 of each of the communication control apparatuses 30b, the communication control apparatus 30a determines the possibility of interference for each combination of secondary systems to detect neighboring systems. Then, the communication control apparatus 30a provides a list of detected neighboring systems to each of the communication control apparatuses 30b.

If a secondary system under control and a secondary system controlled by the other communication control apparatus 30b are indicated to be mutually neighboring systems by the neighboring system list provided by the communication control apparatus 30a, the interference control unit 146 negotiates with the other communication control apparatus 30b to control interference between the neighboring systems. For example, if different frequency channels can be used between the neighboring systems, the interference control unit 146 may allow to change the utilized channel of one or both of the secondary systems. If both neighboring systems can use wireless access methods supporting the mesh protocol, the interference control unit 146 may allow to form a mesh network by assigning a common frequency channel to the neighboring systems. If one or both of the neighboring systems can be allowed to reduce coverage by lowering the maximum transmission power, the interference control unit 146 may instruct the secondary systems to lower the maximum transmission power. Accordingly, interference between the neighboring system can be controlled.

[2-2. CDIS]

Figure 8:
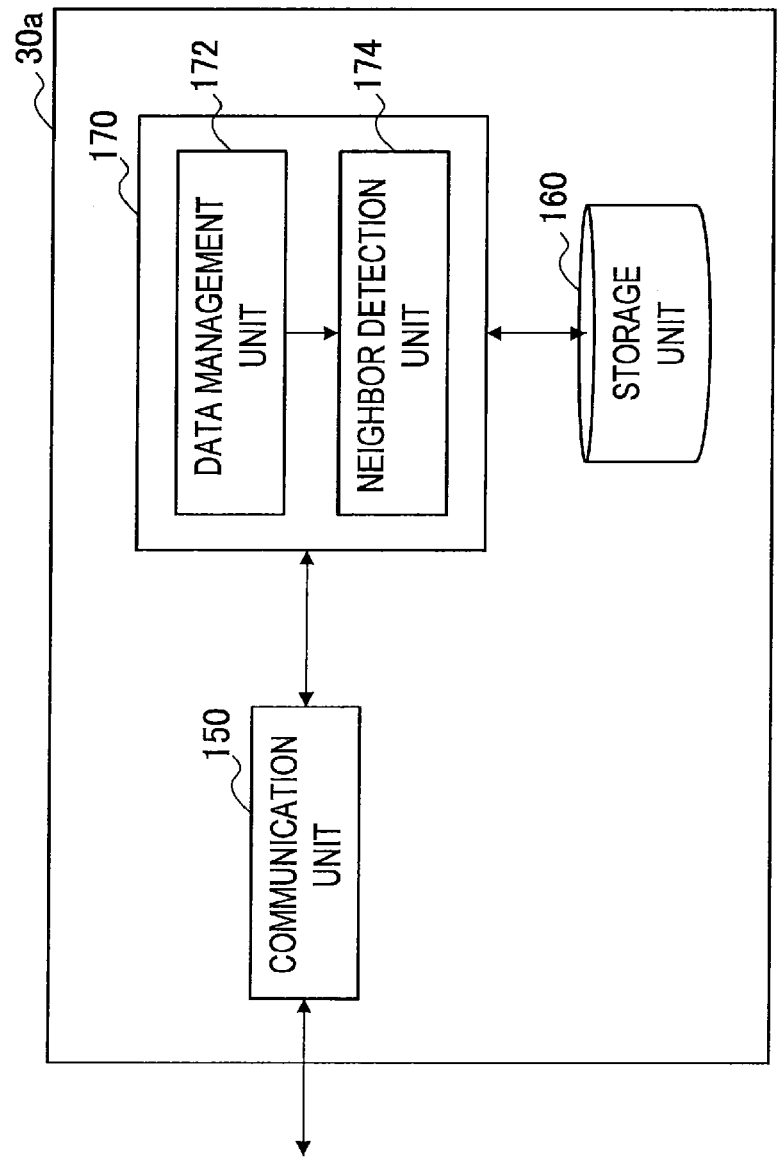
FIG. 8 is a block diagram showing an example of the configuration according to an embodiment of the communication control apparatus corresponding to CDIS.

FIG. 8 is a block diagram showing an example of the configuration of the communication control apparatus 30a according to the present embodiment. The communication control apparatus 30a is an apparatus equivalent to CDIS. From the viewpoint of simplicity of the description, the description of functions of CDIS other than the function related to neighbor detection is omitted here. Referring to FIG. 8, the communication control apparatus 30a includes a communication unit 150, a storage unit 160, and a control unit 170.

The communication unit 150 is a communication interface that mediates communication between the communication control apparatus 30a and the data server 20 or the other communication control apparatus 30. The communication unit 150 typically supports a packet-based (wire or wireless) communication protocol to establish communication connection between the communication control apparatus 30a and another apparatus.

The storage unit 160 is configured by a semiconductor memory or a storage medium such as a hard disk and stores programs and data for processing by the communication control apparatus 30a. Data stored in the storage unit 160 includes, for example, coverage information of each secondary system notified from the communication control apparatus 30b and a neighboring system list generated by the control unit 170 described below.

The control unit 170 corresponds to a processor such as a CPU or DSP. The control unit 170 allows the function of CDIS according to the present embodiment to be carried out by executing programs stored in the storage unit 160 or another storage medium. More specifically, the control unit 170 includes a data management unit 172 and a neighbor detection unit 174.

The data management unit 172 manages various kinds of information for coexistence of a plurality of secondary systems. For example, the data management unit 172 periodically acquires information about the primary system (for example, coverage of the primary system, the position of a primary receiving station, and a list of channels available for secondary usage) from the data server 20 and causes the storage unit 160 to store the acquired information. In addition, the data management unit 172 causes the storage unit 160 to store information (for example, the above coverage information) about secondary systems notified from the communication control apparatus 30b. Then, the data management unit 172 provides information the storage unit 160 is caused to store to the communication control apparatus 30b in response to a request from the communication control apparatus 30b.

The neighbor detection unit 174 determines the possibility of interference between a plurality of secondary systems when coverage information of the secondary systems is notified from the communication control apparatus 30b via the communication unit 150. For example, the neighbor detection unit 174 may determine that interference is possible between secondary systems in which coverage of one system overlaps with that of the other system. Even if there is no overlapping coverage, the neighbor detection unit 174 may determine that interference is possible between secondary systems if the shortest distance between outer circumferences of coverage is below a predetermined threshold. When secondary systems that may interfere with each other are detected, the neighbor detection unit 174 generates a neighboring system list that describes the secondary systems as neighboring systems. Then, the neighbor detection unit 174 provides the generated neighboring system list to the communication control apparatus 30b. A concrete example of the neighboring system list will be described in detail later.

[2-3. Data Example]

(1) Coverage Information (1-1) First Example

Figure 9:
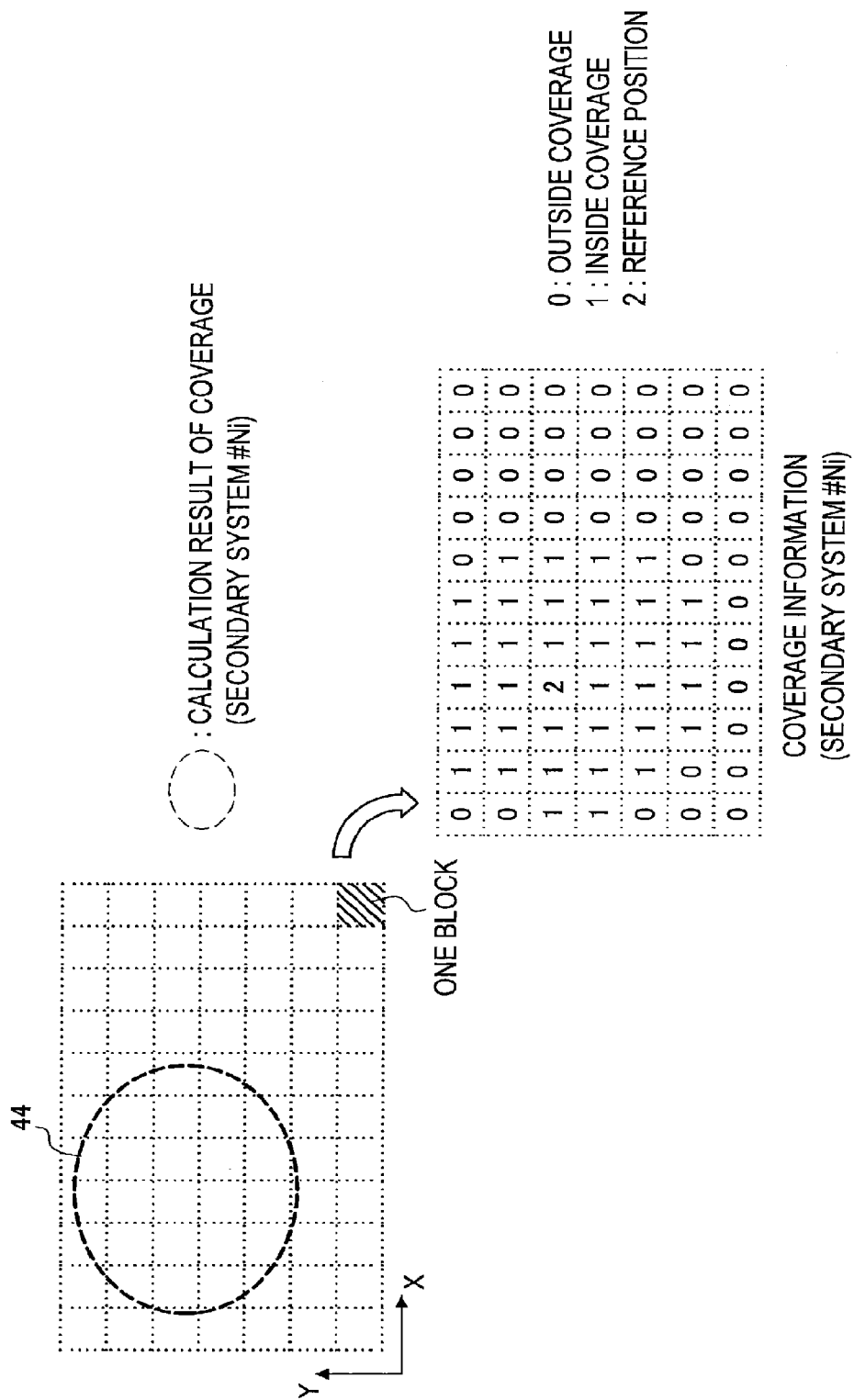
FIG. 9 is an explanatory view illustrating a first example of coverage information generated by CM in an embodiment.

FIG. 9 is an explanatory view illustrating a first example of coverage information generated by the communication control apparatus 30b in the present embodiment. A plurality of blocks formed by dividing a geographical region is shown on the upper left corner of FIG. 9. The calculation unit 144 of the communication control apparatus 30b calculates the range of a service area 44 present extending over one or more blocks as coverage for each secondary system. Then, the calculation unit 144 generates coverage information in a bitmap form indicating whether each block belongs to the calculated coverage. Coverage information of a secondary system Ni in which a block not belonging to coverage is set to 0, a block belonging to coverage is set to 1, and a center block of coverage containing the reference position is set to 2 is shown on the lower right corner of FIG. 9. However, coverage information is not limited the example in FIG. 9 and the shape of each block may be any shape other than the rectangle (for example, the triangle or hexagon).

FIG. 10 is an explanatory view illustrating detection of neighboring systems based on the coverage information illustrated in FIG. 9. Coverage information of two secondary systems Ni, Nj of which the communication control apparatus 30a may be notified from the communication control apparatus 30b is shown in the upper part of FIG. 10. The neighbor detection unit 174 of the communication control apparatus 30a calculates a logical conjunction of values of two pieces of coverage information for each block of the coverage information. As a result, as shown in the lower part of FIG. 10, a bitmap in which only blocks of overlapping coverage have values other than 0 is derived. Thus, if a bitmap contains a value other than 0, the two secondary systems may be determined to have the possibility of interference with each other. If the bitmap contains the value "2", it is understood that a wireless signal from the secondary usage node 40 as the master device of one secondary system can directly reach the secondary usage node 40 of the other secondary system.

Thus, when the first example of coverage information is adopted, the neighbor detection unit 174 of the communication control apparatus 30a can easily determine the possibility of interference between secondary systems by repeating the operation of a simple logical conjunction.

In the first example of coverage information, the value of each block may indicate a power level of a wireless signal of the secondary system assumed in each block. Accordingly, though the amount of data of coverage information increases, it becomes possible to estimate not only the possibility of interference, but also intensity of interference in detail by the neighbor detection unit 174 of the communication control apparatus 30a.

(1-2) Second Example

Figure 11:
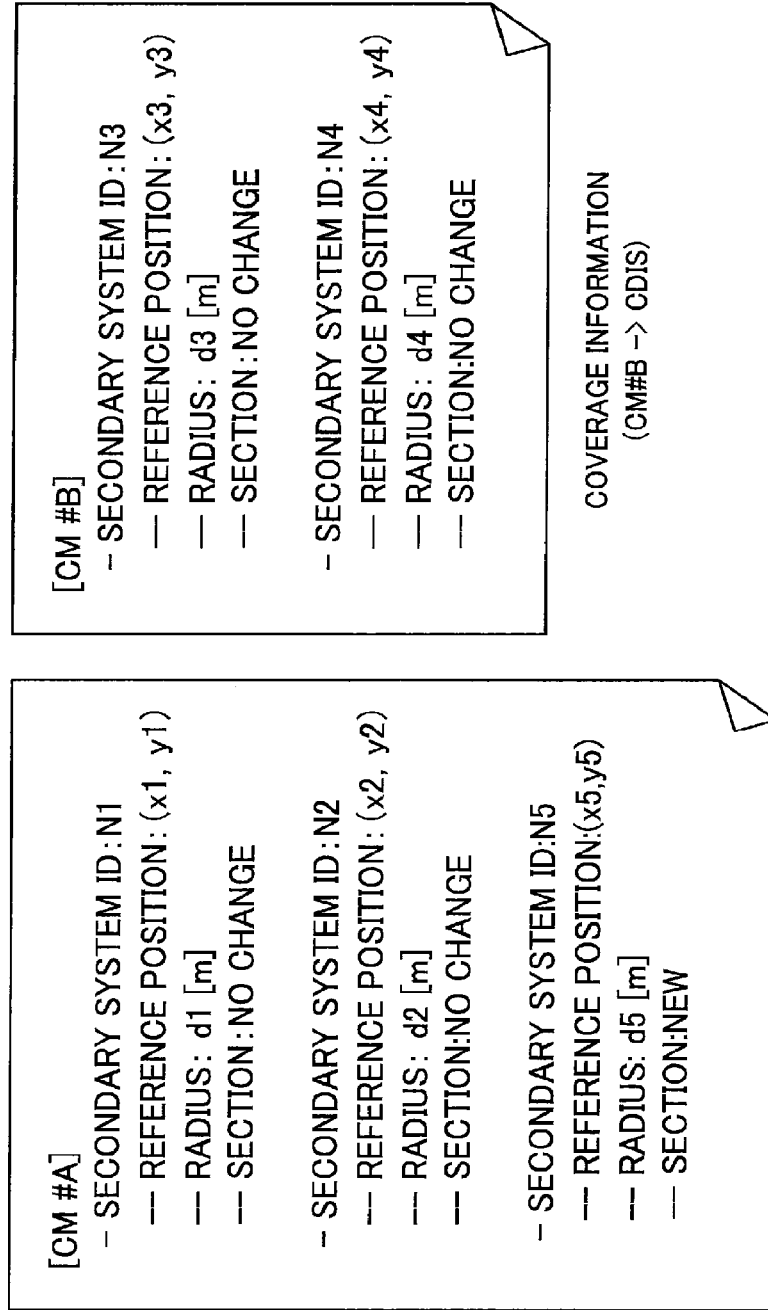
FIG. 11 is an explanatory view illustrating a second example of the coverage information generated by CM in an embodiment.

FIG. 11 is an explanatory view illustrating a second example of coverage information generated by the communication control apparatus 30b in the present embodiment. In the second example, coverage information is information indicating the reference position and radius of coverage of each secondary system in a list form.

Coverage information of which the communication control apparatus (CDIS) 30a is notified from the communication control apparatus (CM#A) 30b is shown on the left side of FIG. 11. The coverage information contains the secondary system ID, reference position (position of the secondary usage node 40), and radius (for example, the radius of the service area around the reference position) of the secondary systems N1, N2, N5 illustrated in FIG. 6. Further, in the present embodiment, a change section indicating whether coverage is changed is attached to coverage information for each secondary system. In the example of FIG. 11, the change section ("New") of the secondary system N5 indicates that coverage information of the secondary system N5 is newly added. Coverage information of which the communication control apparatus (CDIS) 30a is notified from the communication control apparatus (CM#B) 30b is shown on the right side of FIG. 11. The coverage information contains the secondary system ID, reference position, and radius of the secondary systems N3, N4 illustrated in FIG. 6.

When such coverage information is notified, the neighbor detection unit 174 of the communication control apparatus 30a determines the possibility of interference between secondary systems based on the distance between reference positions and two radii for each combination of secondary systems contained in the coverage information. If, for example, the distance between the reference positions is smaller than the sum of radii, the two secondary systems have overlapping coverage. If, for example, the distance between reference positions is smaller than one radius, it is understood that a wireless signal from the secondary usage node 40 as the master device of one secondary system can directly reach the secondary usage node 40 of the other secondary system. In both of these cases, the neighbor detection unit 174 may determine that the possibility of interference is present between secondary systems.

When some secondary system is newly added, the neighbor detection unit 174 may determine only possibilities of interference between the new secondary system and other secondary systems. In the example of FIG. 11, the neighbor detection unit 174 may additionally determine only possibilities of interference between the secondary system N5 and other secondary systems.

(2) Neighboring System List

FIGS. 12 and 13 are explanatory views illustrating examples of a neighboring system list generated by the communication control apparatus 30a in the present embodiment.

The neighboring system list in FIG. 12 assumes the physical relationship between secondary systems illustrated in FIG. 5. The neighboring system list in FIG. 12 indicates that the secondary system N1 belonging to CM#A and the secondary system N2 belonging to CM#A are related as neighboring systems (pair ID: A01) and the secondary system N3 belonging to CM#B and the secondary system N4 belonging to CM#B are related as neighboring systems (pair ID: B01). These two pairs are pairs of neighboring systems belonging to common CM. Such neighboring systems are called here as Intra-CM neighboring systems. On the other hand, neighboring systems belonging to different CM are called Inter-CM neighboring systems. No Inter-CM neighboring system is present in the neighboring system list of FIG. 12.

In the example of FIG. 12, an attribute called "class" is attached to each pair of neighboring systems. "Class" may be an attribute representing the classification of physical relationship of, for example, the following neighboring systems:

Class C1: Master devices are wirelessly communicable
Class C2: Master devices are not directly communicable, but have overlapping coverage
Class C3: Coverage of one secondary system is contained in coverage of the other
Class C4: There is the possibility of interference due to a short distance, though there is no overlapping coverage Such class attributes may be used when CM adjusts the configuration of secondary systems to control interference. For example, for a pair of Class C1, master devices (for example, TVBD in a TV broadcasting system) can directly communicate wirelessly. Thus, two secondary systems can be operated without interfering with each other by assigning a frequency channel common to two secondary systems to allow the master devices to exchange scheduling information or to form a mesh network. For a pair of Class C2, master devices cannot directly communicate wirelessly Thus, when two secondary systems are allowed to form a mesh network, for example, CM may be requested to feed a synchronization signal to each master device. For a pair of Class C3, two secondary systems may be allowed to coexist by even signal transmission of a secondary system having narrower coverage being scheduled by the master device of the other secondary system having wider coverage. Such classifications may be decided by the neighbor detection unit 174 of the communication control apparatus 30a using coverage information illustrated in FIG. 9 or 11.

The neighboring system list in FIG. 13 assumes the physical relationship between secondary systems illustrated in FIG. 6. The neighboring system list in FIG. 13 contains, in addition to pairs contained in the neighboring system list in FIG. 12, three pairs of neighboring systems. The first new pair is a pair of Intra-CM neighboring systems of the secondary system N2 belonging to CM#A and the secondary system N5 belonging to CM#A (pair ID: A02). The second new pair is a pair of Inter-CM neighboring systems of the secondary system N5 belonging to CM#A and the secondary system N3 belonging to CM#B (pair ID: A11). The third new pair is a pair of Inter-CM neighboring systems of the secondary system N3 belonging to CM#B and the secondary system N5 belonging to CM#A (pair ID: B11). The pair A11 and the pair B11 are pairs of essentially the same neighboring systems.

The neighbor detection unit 174 of the communication control apparatus 30a provides such a neighboring system list to each of the communication control apparatuses 30b.

<3. Flow of Processing According to an Embodiment>

FIG. 14 is a flow chart showing an example of the flow of communication control processing for neighbor detection according to the present embodiment.

Referring to FIG. 14, each of the secondary usage nodes 40a, 40b, 40e first collects parameters to calculate coverage of each secondary system (step S11). Similarly, each of the secondary usage nodes 40c, 40d collects parameters to calculate coverage of each secondary system (step S12).

Next, each of the secondary usage nodes 40a, 40b, 40e transmits a parameter list containing collected parameters to the communication control apparatus (CM#A) 30b (step S13). Such a parameter list is received by the first communication unit 110 of the communication control apparatus (CM#A) 30b and acquired by the parameter acquisition unit 142. Similarly, each of the secondary usage nodes 40b, 40c transmits a parameter list containing collected parameters to the communication control apparatus (CM#B) 30b (step S14) Such a parameter list is received by the first communication unit 110 of the communication control apparatus (CM#B) 30b and acquired by the parameter acquisition unit 142.

Next, the calculation unit 144 of the communication control apparatus (CM#A) 30b calculates coverage of each secondary system under control using parameters acquired by the parameter acquisition unit 142 (step S21). Then, the interference control unit 146 notifies the communication control apparatus 30a of coverage information representing coverage of each secondary system calculated by the calculation unit 144 (step S25).

In addition, the calculation unit 144 of the communication control apparatus (CM#B) 30b calculates coverage of each secondary system under control using parameters acquired by the parameter acquisition unit 142 (step S23). Then, the interference control unit 146 notifies the communication control apparatus 30a of coverage information representing coverage of each secondary system calculated by the calculation unit 144 (step S26).

The neighbor detection unit 174 of the communication control apparatus (CDIS) 30a determines the possibility of mutual interference for each combination of secondary systems using coverage information notified from the communication control apparatus 30b to detect neighboring systems (step S30). Then, the neighbor detection unit 174 provides a neighboring system list describing combinations of detected neighboring systems to the communication control apparatus (CM#A) 30b and the communication control apparatus (CM#B) 30b (steps S41, S42).

Next, if the neighboring system list indicates the presence of secondary systems that may interfere with each other, the interference control units 146 of the communication control apparatus (CM#A) 30b and the communication control apparatus (CM#B) 30b negotiate to control interference (step S50). Then, one or both of the communication control apparatus (CM#A) 30b and the communication control apparatus (CM#B) 30b instruct the secondary usage nodes 40 to configure or reconfigure the system to reflect a negotiation result in the configuration of each secondary system (steps S61, S62).

Incidentally, the flow of communication control processing shown in FIG. 14 is only by way of example. That is, each processing step constituting the communication control processing may be executed in an order different from the illustrated order. In addition, a processing step not shown in FIG. 14 may additionally be executed or a part of processing steps may be omitted.

<4. Modifications>

[4-1. First Modification]

In the above embodiment, an example in which CDIS determines the possibility of interference for all combinations of secondary systems is described. However, for example, CM may determine the possibility of interference for each combination of secondary systems under control of CM using coverage information to detect Intra-CM neighboring systems (that is, the communication control apparatus 30b may also include a neighbor detection unit). In such a case, CDIS determines the possibility of interference only for combinations of secondary systems extending over CM to detect Inter-CM neighboring systems. Accordingly, detection processing of Intra-CM neighboring systems is distributed over a plurality of CM so that the load on CDIS can further be reduced.

FIG. 15 is a flow chart showing an example of the flow of communication control processing for neighbor detection according to a first modification as described above. Referring to FIG. 15, each of the secondary usage nodes 40a, 40b, 40e first collects parameters to calculate coverage of each secondary system (step S11). Similarly, each of the secondary usage nodes 40c, 40d collects parameters to calculate coverage of each secondary system (step S12).

Next, each of the secondary usage nodes 40a, 40b, 40e transmits a parameter list containing collected parameters to the communication control apparatus (CM#A) 30b (step S13). Similarly, each of the secondary usage nodes 40b, 40c transmits a parameter list containing collected parameters to the communication control apparatus (CM#B) 30b (step S14).

Next, the communication control apparatus (CM#A) 30b calculates coverage of each secondary system under control using acquired parameters (step S21) to detect Intra-CM neighboring systems from secondary systems belonging to CM#A (step S22). Similarly, the communication control apparatus (CM#B) 30b calculates coverage of each secondary system under control using acquired parameters (step S23) to detect Intra-CM neighboring systems from secondary systems belonging to CM#B (step S24).

Next, the communication control apparatus (CM#A) 30b notifies the communication control apparatus 30a of coverage information representing coverage of each secondary system (step S25). Also, the communication control apparatus (CM#B) 30b notifies the communication control apparatus 30a of coverage information representing coverage of each secondary system (step S26).

The communication control apparatus (CDIS) 30a uses the coverage information notified from these communication control apparatuses 30b to detect Inter-CM neighboring systems from secondary systems extending over CM#A and CM#B (step S31). Then, the communication control apparatus (CDIS) 30a provides a neighboring system list describing combinations of detected Inter-CM neighboring systems to the communication control apparatus (CM#A) 30b and the communication control apparatus (CM#B) 30b (steps S41, S42). Then, the flow of processing may be the same as that of the communication control processing shown in FIG. 14.

[4-2. Second Modification]

Heretofore, examples in which CDIS is arranged in an apparatus that is different from apparatuses in which CM is arranged have mainly been described. However, CDIS may be arranged in one of apparatuses in which CM is arranged. The technology disclosed herein is also applicable to coexistence systems based on specifications (for example, RRS (Reconfigurable Radio Systems) of ETSI (European Telecommunications Standards Institute)) other than IEEE802.19. Also in such a case, in addition to a detection node that determines the possibility of interference between a plurality of secondary systems to detect neighboring systems, a logical node to calculate coverage of each secondary system by using parameters collected from each secondary system is provided. Then, the detection node is notified of coverage information from the node that calculates coverage.

Figure 16:
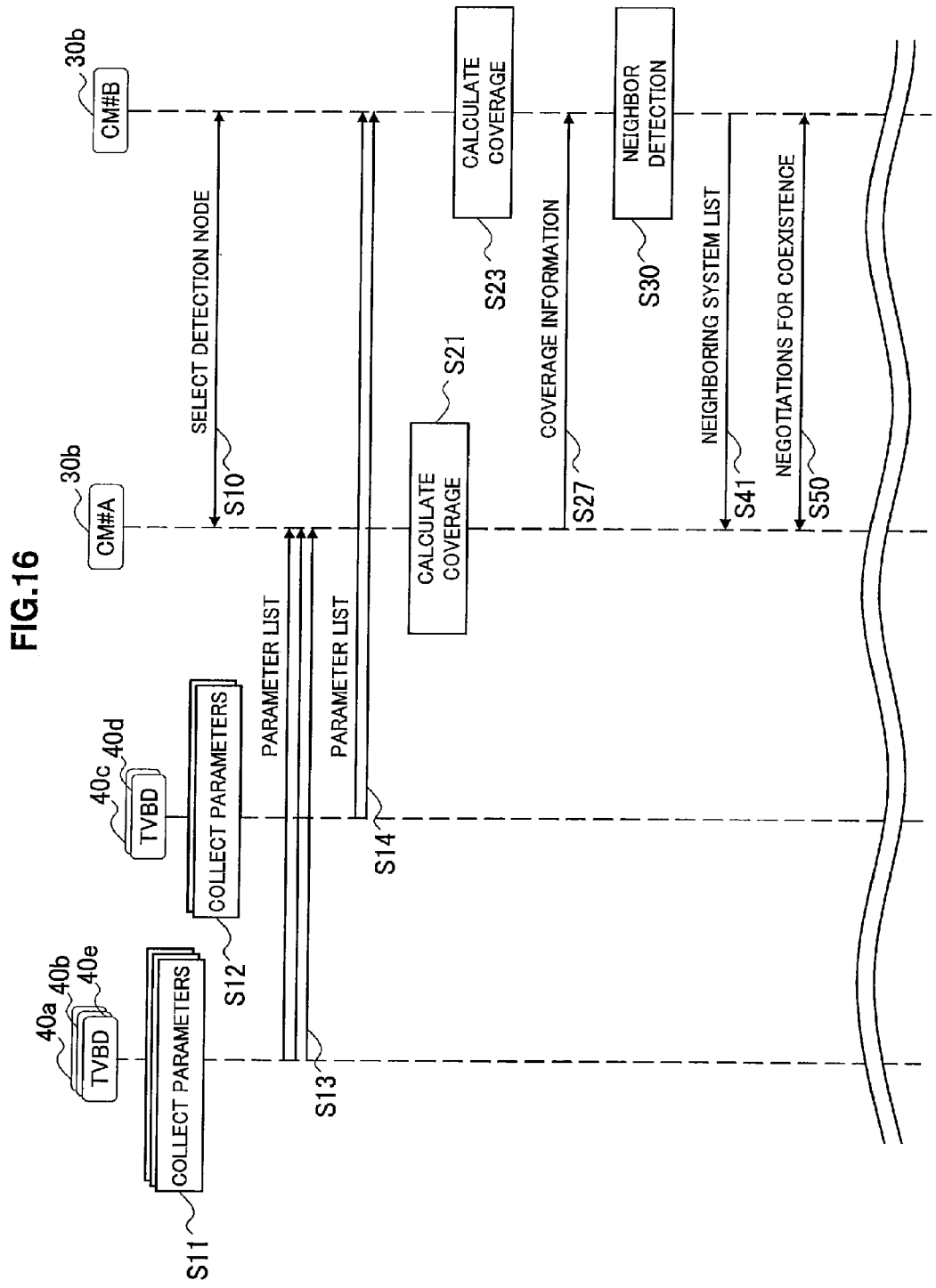
FIG. 16 is a flow chart showing an example of the flow of communication control processing for neighbor detection according to a second modification.

FIG. 16 is a flow chart showing an example of the flow of communication control processing for neighbor detection according to a second modification as described above. Referring to FIG. 16, the detection node that performs neighbor detection is selected in advance from among a plurality of the communication control apparatuses 30b (step S10). The detection node may be detected from the viewpoint of, for example, performance, capabilities, capacities of available resources, or smallness of the number of secondary systems under control of each of the communication control apparatuses 30b. In the example of FIG. 16, it is assumed that the communication control apparatus (CM#B) 30b is selected as the detection node.

Each of the secondary usage nodes 40a, 40b, 40e collects parameters to calculate coverage of each secondary system (step S11) Similarly, each of the secondary usage nodes 40c, 40d collects parameters to calculate coverage of each secondary system (step S12).

Next, each of the secondary usage nodes 40a, 40b, 40e transmits a parameter list containing collected parameters to the communication control apparatus (CM#A) 30b (step S13). Similarly, each of the secondary usage nodes 40b, 40c transmits a parameter list containing collected parameters to the communication control apparatus (CM#B) 30b (step S14)

Next, the communication control apparatus (CM#A) 30b calculates coverage of each secondary system under control using acquired parameters (step S21). Then, the communication control apparatus (CM#A) 30b notifies the communication control apparatus (CM#B) 30b of coverage information representing the calculated coverage of each secondary system (step S27). On the other hand, the communication control apparatus (CM#B) 30b also calculates coverage of each secondary system under control using acquired parameters (step S23).

Next, the communication control apparatus (CM#A) 30b determines the possibility of mutual interference for each combination of secondary systems using coverage information notified from the communication control apparatus (CM#A) 30b and coverage information generated by the communication control apparatus (CM#B) 30b itself to detect neighboring systems (step S30). Then, the communication control apparatus (CM#B) 30b provides a neighboring system list describing combinations of detected neighboring systems to the communication control apparatus (CM#A) 30b (step S41). Next, if secondary systems that may interfere with each other are present, the communication control apparatus (CM#A) 30b and the communication control apparatus (CM#B) 30b negotiate to control interference (step S50). Then, the flow of processing may be the same as that of the communication control processing shown in FIG. 14.

<5. Summary>

Heretofore, an embodiment and modifications thereof have been described in detail using FIGS. 1 to 16. According to the technology described herein, a communication control apparatus having a function as CM calculates coverage of each secondary system using parameters to calculate coverage of each secondary system and a detection node that performs neighbor detection is notified of coverage information representing the calculated coverage of each secondary system. Thus, parameters for coverage calculation with a large amount of data are not transmitted to the detection node and so the load of traffic in a network is reduced. In addition, there is no need for the detection node to calculate coverage of many secondary systems and so the load of calculation processing of the detection node is also reduced.

Therefore, a plurality of secondary systems can be operated smoothly by the concentration of load being avoided. In addition, according to the above embodiment, when various secondary systems are operated by a plurality of operators, there is no need for each operator to disclose detailed parameters of systems to the operator having the detection node. Therefore, smooth coexistence of systems operated by the plurality of operators is enabled.

A sequence of control processing by each apparatus described herein may be realized by using any of software, hardware, and a combination of software and hardware. A program constituting software is stored in, for example, a storage medium provided inside or outside each apparatus. Then, each program is read into RAM (Random Access Memory) during execution and executed by a processor such as a CPU (Central Processing Unit).

The preferred embodiments of the present disclosure have been described in detail above with reference to the accompanying drawings, whilst the technical scope of the present technology is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1) A communication control apparatus including:
a parameter acquisition unit that acquires parameters to calculate coverage of secondary systems from a secondary usage node operating the secondary systems on a frequency channel allocated to a primary system;
a calculation unit that calculates the coverage of the secondary systems using the parameters acquired by the parameter acquisition unit; and
an interference control unit that notifies a detection node that detects neighboring secondary systems of the secondary systems, of coverage information representing the coverage of the secondary systems calculated by the calculation unit.

(2) The communication control apparatus according to (1), wherein the coverage information is map information indicating whether each of a plurality of geographical blocks belongs to the coverage.

(3) The communication control apparatus according to (1), wherein the coverage information is information indicating a reference position and a radius of the coverage.

(4) The communication control apparatus according to any one of (1) to (3), wherein the parameters indicate at least one of a position of the secondary usage node, an antenna height, maximum transmission power, an antenna gain, and minimum reception sensitivity.

(5) The communication control apparatus according to any one of (1) to (4), wherein when the neighboring secondary systems controlled by the other communication control apparatus are detected by the detection node, the interference control unit conducts negotiations with another communication control apparatus to control interference between the secondary systems.

(6) The communication control apparatus according to (5), wherein the interference control unit adjusts at least one of a utilized channel, a wireless access method, and maximum transmission power of the secondary systems or the neighboring secondary systems by the negotiations.

(7) The communication control apparatus according to (1) to (6), further including:
a neighbor detection unit that detects the neighboring secondary systems from a plurality of the secondary systems belonging to the apparatus,
wherein the detection node detects the neighboring secondary systems belonging to the different communication control apparatuses.

(8) The communication control apparatus according to any one of (1) to (7), wherein the detection node is one of a plurality of the communication control apparatuses, each having a function to calculate coverage of one or more secondary systems.

(9) A communication control method of a control node that controls communication by a secondary usage node operating secondary systems on a frequency channel allocated to a primary system, the method including:
acquiring parameters to calculate coverage of the secondary systems from the secondary usage node;
calculating the coverage of the secondary systems using the acquired parameters; and
notifying a detection node that detects neighboring secondary systems of the secondary systems, of coverage information representing the calculated coverage of the secondary systems.

(10) A communication control system, including:
a secondary usage node that operates secondary systems on a frequency channel allocated to a primary system;
a control node that controls communication by the secondary usage node; and
a detection node that detects neighboring secondary systems of the secondary systems,
wherein the control node includes
a parameter acquisition unit that acquires parameters to calculate coverage of the secondary systems from the secondary usage node,
a calculation unit that calculates the coverage of the secondary systems by using the parameters acquired by the parameter acquisition unit, and
an interference control unit that notifies the detection node of coverage information representing the coverage of the secondary systems calculated by the calculation unit.

REFERENCE SIGNS LIST 30a detection node
30b communication control apparatus (control node)
40 secondary usage node
142 parameter acquisition unit
144 calculation unit
146 interference control unit

The invention claimed is:

1. An electronic device comprising:
circuitry configured to:
obtain parameters related to a secondary system from a secondary node, the secondary system being managed by the secondary node using frequency channel allocated to a first system; and
control interference with a neighboring secondary system detected in consideration of the parameters, the controlling interference being based on class information indicating classification of positional relation.

2. The electronic device of claim 1, wherein the class information includes at least one of a first class or a second class, the first class indicating a first positional relation in which master devices are able to communicate directly with each other, the second class indicating a second positional relation in which master devices are unable to communicate directly with each other and coverages of the master devices overlaps each other.

3. The electronic device of claim 2, wherein the class information further includes a third class indicating a third positional relation in which coverages of master devices do not overlap each other.

4. The electronic device of claim 3, wherein the class information further includes a fourth class indicating a fourth positional relation in which a coverage of secondary system is included in a coverage of another secondary system.

5. The electronic device of claim 1, wherein the class information is determined based on coverage information.

6. The electronic device of claim 5, wherein the coverage information is corresponding to map information, the map information indicating relation between a plurality of geographic partition and coverage of secondary systems.

7. The electronic device of claim 5, wherein the coverage information includes position and radius of coverage.

8. The electronic device of claim 1, wherein the parameters includes at least one of location, antenna height, maximum transmission power, antenna gain or minimum receive power of the secondary node.

9. A method for managing communication, comprising:
obtaining parameters related to a secondary system from a secondary node, the secondary system being managed by the secondary node using frequency channel allocated to a first system; and
controlling interference with a neighboring secondary system detected in consideration of the parameters, the controlling interference being based on class information indicating classification of positional relation.

* * * * *